Dec. 24, 1963

K. P. MUELLER 3,115,147

PNEUMATIC HESITATION RELAY

Filed Feb. 28, 1962

INVENTOR.
KLAUS P. MUELLER

BY
Mead, Browne, Schuyler & Beveridge
ATTORNEYS.

United States Patent Office 3,115,147
Patented Dec. 24, 1963

3,115,147
PNEUMATIC HESITATION RELAY
Klaus P. Mueller, Goshen, Ind., assignor to Robertshaw Controls Company, a corporation of Delaware
Filed Feb. 28, 1962, Ser. No. 176,251
10 Claims. (Cl. 137—116.5)

This invention relates to pneumatic relays particularly adapted for use with unit ventilators.

In controlling the temperature of a room or space with a unit ventilator, it is customary to operate the fresh air damper with a "hesitation" cycle, i.e. the damper is open to a minimum position until the controlling pressure reaches a first value which is referred to as the "hesitation point," after which the damper remains at the minimum position as the pressure increases until the pressure reaches a second value known as the "finish point," whereupon the damper is further opened with additional increases in the pressure. In prior devices, the hesitation and finish points of the control cycle are usually provided by the mechanical forces of springs or weights which are progressively "picked up" by the actuating arm of the damper as it moves towards its open position.

An object of this invention is to provide a pneumatic relay which receives a variable input pressure and transmits an output pressure having a hesitation and finish point.

A more specific object is to provide a pneumatic relay which receives a variable signal pressure and transmits an output pressure that increases linearly with the signal pressure until the input pressure reaches a hesitation point, the output pressure remaining at the hesitation point when the signal pressure is between the hesitation and finish points, and again increases with signal pressure when the signal pressure is greater than the finish point.

The foregoing, and other objects are achieved by the provision of an output chamber having a flexible wall and an inlet port connected with a variable signal pressure which is controlled by a supply valve. Carried by the flexible wall is an actuating stem having an exhaust passage which actuates the supply valve in response to movement of the flexible wall to control the supply and exhaust of fluid in the output chamber. For controlling the pressure in the output chamber, a hesitation spring is seated against the flexible wall and is adjustable to exert a force on the flexible wall in opposition to fluid pressure in the output chamber, and acting through the actuating stem, maintains the supply valve open until the pressure in the output chamber is sufficient to balance the forces on the flexible wall. When the output pressure exceeds the value determined by the hesitation spring force, the actuating stem vents the output chamber and permits the supply valve to close, interrupting the supply of fluid to the output chamber until the forces on the flexible wall and exhaust stem are balanced.

For increasing the output pressure over the value determined by the force of the hesitation spring, a pilot chamber having a flexible wall is connected with the hesitation spring chamber so that pressure from the pilot chamber augments the force of the hesitation spring. Communication between signal pressure and the pilot chamber is controlled by a pilot valve and a pilot valve actuating stem having an exhaust passage, the pilot valve actuating stem controlling supply and exhaust of fluid in the pilot chamber in response to movement of the pilot chamber flexible wall. Pilot chamber pressure is determined by a finish point spring which is adjustable to urge the pilot valve actuating stem to the exhaust position, so that when the only forces acting on the pilot chamber flexible wall is that of the finish point spring, the pilot chamber is connected with exhaust. However, the chamber containing the finish point spring is connected with the signal pressure which acts on the flexible wall of the pilot chamber in a direction opposite to the force of the finish point spring. Accordingly, when the signal pressure is sufficient to overcome the force of the finish point spring, the pilot chamber is disconnected from exhaust and the pilot valve is opened to connect the pilot chamber with the signal pressure. Since the pilot chamber is connected with the hesitation spring chamber, the pilot pressure augments the force of the hesitation spring to increase the pressure in the output chamber. Thus, the hesitation point is the pressure required in the output chamber to balance the force of the hesitation spring, and the finish point is the signal pressure required to overcome the finish point spring and disconnect the pilot chamber from exhaust.

Figure 1:
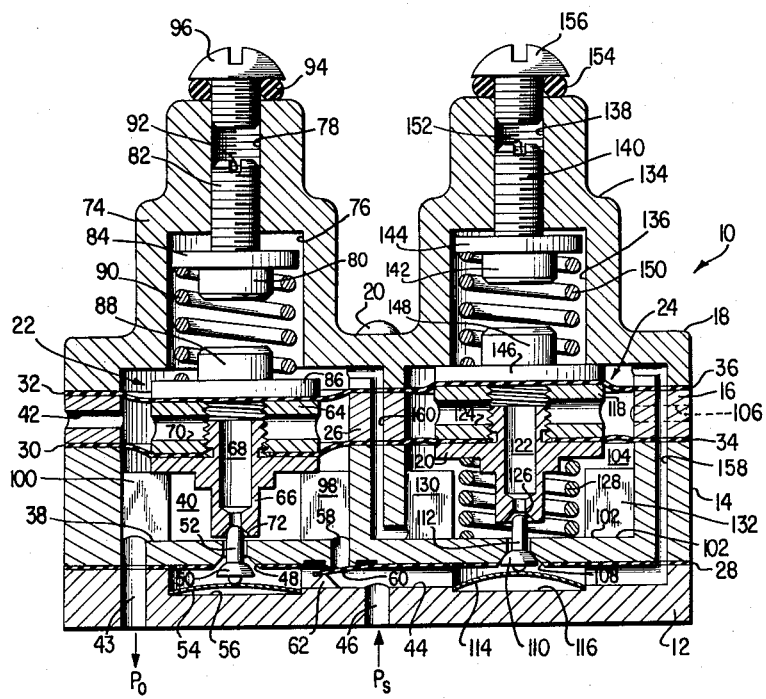
FIG. 1 is a sectional view of a pneumatic relay embodying a preferred form of the invention.

With reference to FIG. 1 a relay casing 10 is illustrated which comprises a base member 12, intermediate sections 14 and 16, and a cover member 18. Conventional screws 20 connect the sections together with the screws passing through openings in the sections (not shown) in a well-known manner. Formed in casing 10 is a pair of cavities 22 and 24 which are separated by a vertical partition 26.

Clamped between the opposed peripheral edges base member 12 and section 14 is a resilient gasket 28 which provides a fluid tight seal between the members. Mounted in cavity 22 is a pair of flexible diaphragms, 30 and 32, each having their peripheral edges clamped respectively between members 14 and 16 and between members 16 and 18. Cavity 24 is provided with a pair of similarly mounted flexible diaphragms 34 and 36. Diaphragms 30 and 32 cooperate with the lower wall 38 of cavity 22 to define an output chamber 40, with the space between diaphragms 30 and 32 communicating with atmosphere, or some other ambient fixed pressure, through a passage 42 formed in the wall of the casing. Extending through lower wall 38 and base member 12 is an outlet port 43 for transmitting an output pressure from chamber 40 to a piston actuator or the like of a damper regulating mechanism (not shown).

Base member 12 is formed with a passage 44 having an inlet port 46 for connection with a source of variable signal pressure. Output chamber 40 communicates with passage 44 through a supply port 48 which is conical in shape on its lower side to provide a valve seat. Fluid flow through supply port 48 is controlled by a supply valve 50 having an exhaust stem 52 which projects through supply port 48 into chamber 40. Supply valve 50 is biased closed against supply port 48 by a bowed spring washer 54 which is seated in a recess 56 formed in passage 44. Chamber 40 also communicates with inlet passage 44 through a relief port 58 which is controlled by a flapper check valve 60 which is so designed that when the pressure in chamber 40 is greater than the pressure in inlet passage 44 check valve 60 will open and seat against a knife-edge projection 62 in passage 44 to equalize the pressure in chamber 40 and passage 44. Check valve 60 will close relief port 58 upon a minute increase in the pressure in passage 44 over the pressure in chamber 40.

Carried by diaphragm 30 is a spacer member 64 and a valve actuating stem 66. Actuating stem 66 is provided with a threaded projection which extends through an opening in the central portion of diaphragm 30 and is received in a threaded opening in spacer member 64 to clamp the central portion of diaphragm 30 between the flange of actuating stem 66 and spacer member 64. Actuating stem 66 is provided with an exhaust passage 68 which communicates at its upper end with a horizontal exhaust passage 70 in spacer member 64. The lower end of exhaust passage 68 is reduced in diameter to form a conical exhaust valve seat 72 for cooperation with exhaust stem 52 of supply valve 50 to control communication between output chamber 40 and atmosphere.

Integrally formed on cover member 18 is a hesitation spring housing 74 which is provided with a recess 76 having a threaded hole 78 in its upper wall. Recess 76 defines a hesitation spring chamber above diaphragm 32. Threadedly mounted in hole 78 is the stem 82 of an adjusting nut 80 having en enlarged flange 84 providing a spring seat. Mounted on the upper side of diaphragm 32 concentric with spacer member 64 is a spring plate 86 formed with an upwardly projecting circular boss 88. Mounted between spring plate 86 and flange 84 of adjusting nut 80 is a compression spring 90 which is maintained in axial alignment by the head of adjusting nut 80 and boss 88 of spring plate 86, each of which projects axially within spring 90. Spring 90 acts through spring plate 86, spacer member 64, and valve actuating stem 66 to bias supply valve 50 to its open position relative to supply port 48 against the bias of spring washer 54. The biasing force of spring 90 may be adjusted by rotation of adjusting nut 80, and a screwdriver slot 92 is provided in the upper end of stem 82 for this purpose. Hestitation chamber 76 is sealed from atmosphere by an O-ring 94 which is compressed between the head of a screw 96 and the top of cover member 18. Screw 96 is received in the upper end of threaded bore 78. Downward movement of valve actuating stem 66 is limited by the engagement of the flange of stem 66 with a pair of bosses 98 and 100 formed in chamber 40.

Diaphragm 34 cooperates with the lower wall 102 of cavity 24 to define a pilot chamber 104 which communicates with inlet passage 44 through a pilot port 108 having a conical valve seat formed on its lower side. Flow through pilot port 108 is controlled by a pilot valve 110 which cooperates with the valve seat of pilot port 108. Pilot valve 110 is formed with an exhaust valve stem 112 which projects through pilot port 108 into pilot chamber 104. Pilot valve 110 is biased against the valve seat portion of pilot port 108 by a bowed spring washer 114 mounted in a recess 116 provided in passage 44.

Diaphragm 34 has its central portion clamped between a spacer member 118 and a pilot valve actuating stem 120 which are similar in construction to spacer member 64 and valve actuating stem 66, respectively. Pilot valve actuating stem 120 is provided with an exhaust passage 122 communicating at its upper end with a passage 124 formed in spacer member 118. Casing member 16 has a port 106 communicating with the space between diaphragm 34 and 36 to provide communication between pilot chamber 104 and atmosphere when exhaust passage 122 is open. Exhaust passage 122 is provided with an exhaust valve seat 126 at its lower end which cooperates with exhaust valve stem 112 of pilot valve 110 to control communication between pilot chamber 104 and atmosphere. Seated between lower wall 102 and the enlarged flange of pilot valve actuating stem 120 is a spring 128 which resiliently biases actuating stem 120 toward an upward direction to connect pilot chamber 104 with atmosphere. Downward movement of pilot valve actuating stem 20 is limited by bosses 130 and 132 which are provided in pilot chamber 104.

Integrally formed on cover member 18 concentric with cavity 24 is a finish point spring housing 134. Spring housing 134 encloses a spring recess 136 defining a finish point pressure chamber above diaphragm 36, and having a threaded bore 138 formed in its upper wall. Bore 138 threadedly receives the stem 140 of an adjusting nut 142 having a spring seat flange 144. Mounted on the upper side of diaphragm 36 is a spring plate 146, similar in construction to spring plate 86, having a circular boss 148, and a finish point spring 150 is mounted in compression between spring plate 146 and flange 144 of adjusting nut 142. The biasing force of spring 150 may be adjusted by rotation of adjusting screw 142 through a screwdriver slot 152 in the manner previously described with reference to spring 90. Spring recess 136 is sealed against atmosphere by the cooperation of an O-ring 154 and a screw 156 threadedly received in bore 138.

Spring recess 136 communicates with inlet passage 44 through a passage 158 formed in the wall of casing 10, and pilot chamber 104 communicates with hestitation chamber 76 through a passage 160 formed in the partition 26 which separates cavities 22 and 24. Spring 150 exerts a downward force on pilot valve actuating stem 120 in opposition to spring 128 and, accordingly, the position of pilot valve actuating stem 120 is controlled by rotation of adjusting nut 142 to vary the compression of spring 150. Thus, spring 150 acts in combinations with spring 128 to determine the finish point pressure. Upward movement of pilot valve actuating stem 120 is limited by the engagement of spring plate 146 with the shoulder formed at the junction of spring recess 136 with cavity 24. Upward movement of actuating stem 66 is limited in a similar manner by cooperation of spring plate 86 with the shoulder formed by spring recess 76.

*Operation*

Figure 2:
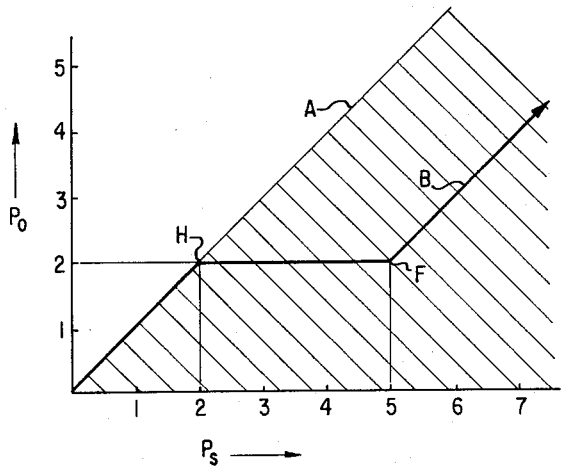
FIG. 2 is a diagram illustrating the relationship between the output pressure and the signal pressure.

With reference to FIG. 2, the hesitation cycle is illustrated in the diaphragm with the curve A representing the signal pressure ($Ps$) and the curve B representing the output pressure ($Po$). Signal pressure ($Ps$) is a variable pressure which is supplied to inlet passage 44 through port 46, and output pressure ($Po$) is the pressure in output chamber 40 which is transmitted through port 43 to the actuating mechanism of a unit ventilator damper. In the diagram of FIG. 2, the relay has been adjusted to provide a hesitation point H of 2 p.s.i., and a finish point F of 5 p.s.i. This means that when the signal pressure ($Ps$) is less than 2 p.s.i., the output pressure ($Po$) is the same as the signal pressure. When the signal pressure is between 2 p.s.i. and 5 p.s.i., the output pressure ($Po$) remains at 2 p.s.i., and when signal pressure ($Ps$) increases above 5 p.s.i. the output pressure ($Po$) again increases linearly with the signal pressure, but follows it by a value equal to the difference between finish point F and hesitation point H. Expressed mathematically, when the signal pressure is above finish point F:

Output pressure ($Po$) = signal pressure ($Ps$) − ($F$−$H$), and with the relay adjusted to the condition illustrated in FIG. 2, when the signal pressure ($Ps$) is 6 p.s.i.;

$$Po = 6 - (5-2) = 3 \text{ p.s.i.}$$

When the signal pressure is greater than 2 p.s.i. but less than 5 p.s.i.:

$$Po = 2 \text{ p.s.i.}$$

and when the signal pressure is less than 2 p.s.i.:

$$Po = Ps$$

Referring again to FIG. 1, hesitation point H is determined by the biasing force of spring 90. For the cycle of operation illustrated in FIG. 2 having a hesitation point H of 2 p.s.i., adjusting nut 80 is rotated until a pressure of 2 p.s.i. in chamber 40 acting on the effective area of diaphragm 30 is required to balance the force of spring 90 and permit supply valve 50 to close. For example, assuming, for purposes of illustration only, that the effective area of diaphragm 30 is 0.5 square inch, spring 90 should apply a force of one pound on spring plate 86 to obtain a hesitation point H of 2 p.s.i., since a 2 p.s.i. pressure against diaphragm 30 will result in a net upward force of one pound, the effect of spring washer 54 being considered negligible.

Finish point F is determined by adjusting the force of spring 150. For a finish point pressure of 5 p.s.i., adjusting nut 142 is rotated until a pressure of 5 p.s.i. in finish point pressure chamber 136 acting downwardly on the effective area of diaphragm 36 will cause actuating stem 120 to seat against stem 112 of pilot valve 110 to close exhaust passage 122. Spring 128 must always exert a greater force than spring 150 so that force in addition to that of spring 150 is required to actuate pilot valve 110.

Assuming, also for purposes of illustration, that diaphragm 36 has an effective area of 0.5 square inch, and that spring 150 is adjusted so that the combined effect of springs 150 and 128 produces a net upward force of 2.5 pounds acting on pilot valve actuating stem 120, a 5 p.s.i. pressure in spring recess 136 acting on diaphragm 36 will produce a net downward force of 2.5 pounds to balance the forces on actuating stem 120 and move it into engagement with exhaust stem 112 of the pilot valve.

FIG. 1 illustrates the positions of the elements prior to the introduction of signal pressure at port 46. Actuating stem 66 is seated against bosses 98 and 100 due to the force of spring 90, and exhaust valve seat 72 has engaged exhaust stem 52 of supply valve 50 to shut off communication between output chamber 40 and atmosphere. Supply valve 50 is displaced from supply port 48 against spring washer 54 permitting output chamber 40 to communicate with inlet passage 44, and check valve 60 is in its open position uncovering relief port 58. Spring plate 146 is seated against the upper wall of cavity 24 due to the force of spring 128, which is greater than that of spring 150, to disengage actuating stem 120 from the pilot valve exhaust stem 112, and pilot chamber 104 communicates with atmosphere through passages 122, 124 and 106. Spring washer 114 biases pilot valve 110 against its seat at pilot port 108 shutting off communication between inlet passage 44 and pilot chamber 104. The hesitation chamber 76 above diaphragm 32 communicates with pilot chamber 104 through 160 in partition 26 and accordingly, the upper side of diaphragm 32 is exposed to atmospheric pressure through pilot chamber 104. Hence the only force acting on actuating stem 66 in opposition to output pressure is that of spring 90.

Again assuming that the relay is adjusted to a hesitation value H of 2 p.s.i., and a finish point value F of 5 p.s.i., signal pressure is introduced at port 46 and flows through inlet passage 44. Check valve 60 immediately closes against relief port 58, and the signal pressure flows through support port 48 to output chamber 40. Supply valve 50 remains open as long as the signal pressure is less than 2 p.s.i. since a 2 p.s.i. pressure is required to overcome the force of spring 90. The pressure in output chamber 40 cannot exceed 2 p.s.i. since any increase over 2 p.s.i. will cause actuating stem 66 to become disengaged from exhaust valve stem 52 and vent the pressure in chamber 40 until the pressure is reduced to 2 p.s.i. to balance the forces on the diaphragm. Accordingly, as soon as the signal pressure exceeds 2 p.s.i., the hesitation point, supply valve 50 closes against supply port 48 to interrupt the flow from passage 44, and the pressure in output chamber 40 remains at 2 p.s.i.

Signal pressure also flows from inlet passage 44 through passage 158 into finish point pressure chamber 136 and, acting on diaphragm 36, tends to urge pilot valve actuating stem 120 downwardly against spring 128. When the signal pressure reaches a value of 5 p.s.i., the finish point pressure, exhaust valve seat 126 engages exhaust valve stem 112 to disconnect chamber 104 from atmosphere. As soon as the signal pressure exceeds 5 p.s.i., pilot valve 110 is moved away from pilot port 108 by stem 120, and signal pressure is admitted to pilot chamber 104 and flows through passage 160 in partition 26 to hesitation chamber 76 to augment the force of spring 90 on diaphragm 32. Consequently, the additional pressure above diaphragm 32 unbalances the forces on actuating stem 66 causing it to again move downwardly and unseat supply valve 50, and the output pressure increases until the pressure in chamber 104 is sufficient to exert a force on diaphragm 30 equal to the force of spring 90 plus the force due to signal pressure acting on diaphragm 32. Output pressure in chamber 104 continues to increase with the signal pressure but is always less than the signal pressure by a value equal to the difference between the finish point value and the hesitation value. Assuming that the signal presure has reached a value of 6 p.s.i., the pressure in pilot chamber 104 and hesitation chamber 76 above diaphragm 32 is 1 p.s.i., and the pressure in output chamber 40 is 3 p.s.i. in order to balance the forces action on actuating stem 66.

As the signal pressure decreases, the downward force on pilot valve actuating stem 102 decreases accordingly, and when the signal pressure is less than 5 p.s.i., exhaust valve seat 126 is disengaged from stem 112 and pilot chamber 104 is exhausted to atmosphere. When pilot chamber 104 is exhausted to atmosphere, the pressure above diaphragm 32 is suddenly reduced and actuating stem 66 moves upwardly to vent output chamber 40 until the forces acting on stem 66 are again balanced with a 2 p.s.i. pressure in output chamber 40. Thus, when the signal pressure decreases below 5 p.s.i., the output pressure abruptly decreases to 2 p.s.i. and remains at 2 p.s.i. until the signal pressure decreases to 2 p.s.i. When the signal pressure decreases below 2 p.s.i., check valve 60 opens to equalize the pressures in output chamber 40 and inlet passage 44, and the reduction of pressure in output chamber 40 causes actuating stem 66 to open supply valve 50, and output chamber 40 is connected directly with inlet passage 44, and the signal pressure and output pressures are the same.

While hesitation and finish point values have been referred to for purposes of explanation, it should be understood that an unlimited number of combinations of hesitation and finish point values is possible. Hesitation point H and finish point F may be adjusted to any value within the shaded area of FIG. 2.

While a specific example of the invention has been illustrated and described, it will be understood that the invention is not limited to the precise construction illustrated, and that various alterations and modifications in the construction and arrangement of parts are possible within the scope of the invention as defined by the appended claims.

I claim:

1. A pneumatic relay comprising:
   an inlet passage for connection with a variable signal pressure,
   an output chamber having a wall movable in response to pressure variations in the output chamber,
   means controlled by the position of the movable wall for controlling communication between the output chamber and the inlet passage, and the output chamber and atmosphere,
   means biasing the movable wall in a direction to maintain communication between the output chamber and the inlet passage when the signal pressure is less than a first value determined by the force of the biasing means, and to maintain the pressure in the output chamber at said first value when the signal pressure is between said first value and a second higher value,
   and means for augmenting said biasing means when the signal pressure exceeds said second value to maintain the pressure in the output chamber at a value equal to the signal pressure less the difference between the first and second values.

2. A pneumatic relay comprising:
   an inlet passage for connection with a variable signal pressure,
   an expansible output chamber having a first movable wall,
   means connected with the first movable wall for connecting the output chamber with the inlet passage upon movement of the first movable wall in one direction and for connecting the output chamber with atmosphere upon movement of the first movable wall in the opposite direction, first means biasing the first movable wall in said one direction to maintain communication between the output chamber and the inlet passage until the signal pressure exceeds a first value as determined by the force of the biasing means, an expansible pilot chamber having a second movable wall, means connected with the second movable wall connecting the pilot chamber with the inlet passage upon movement of the second movable wall in one direction, and connecting the pilot chamber with atmosphere upon movement of the second movable wall in the opposite direction, means connecting the side of the second movable wall opposite the pilot chamber with the pressure in the inlet passage, second means biasing the second movable wall in said opposite direction until the signal pressure exceeds a second value greater than said first value as determined by the force of the second biasing means, and means connecting the side of the first movable wall opposite the output chamber with the pressure in the pilot chamber for augmenting the force of the first biasing means when the signal pressure exceeds said second value.

3. A pneumatic relay comprising:

an inlet passage for connection with a variable signal pressure, an output chamber and a pilot chamber, a first movable wall exposed on one side to the pressure in the output chamber and on the other side to the pressure in the pilot chamber.

means connected with the first movable wall for connecting the output chamber with the inlet passage upon movement of the first movable wall in one direction, and connecting the output chamber with atmosphere upon movement of the first movable wall in the opposite direction, first means biasing the first movable wall in said one direction for maintaining communication between the output chamber and the inlet passage until the signal pressure exceeds a first value as determined by the force of said first biasing means, a second movable wall exposed on one side to the pressure in the pilot chamber and on the other side to the pressure in the inlet passage, means connected with the second movable wall for connecting the pilot chamber with the inlet passage upon movement of the second movable wall in one direction to augment the force of said first biasing means, and connecting the pilot chamber with atmosphere upon movement of the second movable wall in an opposite direction.

and second means biasing the second movable wall in said opposite direction to maintain communication between the pilot chamber and atmosphere until the signal pressure exceeds a second value determined by the force of said second biasing means.

4. A pneumatic relay comprising:

an inlet passage for connection with a variable signal pressure, an output chamber, a movable wall exposed on one side to the pressure in the output chamber, means connected with the movable wall for connecting the output chamber with the inlet passage upon movement of the movable wall in one direction and connecting the output chamber with atmosphere upon movement of the movable wall in the opposite direction, means biasing the movable wall in said one direction to maintain communication between the output chamber and the inlet passage until the signal pressure exceeds a first value determined by the force of said biasing means, and signal pressure responsive means connected with the inlet passage operative to normally connect the other side of the movable wall with atmosphere when the signal pressure is less than a second value, higher than the first value, and operative to connect said other side of the movable wall to a pressure equal to the signal pressure less said second value when the signal pressure exceeds said second value.

5. A pneumatic relay comprising:

an inlet passage for connection with a variable signal pressure, an output chamber having an inlet and an outlet, mechanism for maintaining the pressure in the output chamber equal to the signal pressure when the signal pressure is less than a first value, and for maintaining the pressure in the output chamber at said first value when the signal pressure is between the first value and a second value higher than the first value, and for maintaining the pressure in the output chamber equal to the signal pressure less the difference between the first and second values when the signal pressure is greater than the second value, said mechanism including, a movable wall having one side exposed to the pressure in the output chamber and the other side exposed normally to a constant pressure, a normally closed valve in the inlet for controlling the communication between the inlet passage and the output chamber and operatively connecting with the movable wall for movement to an open position upon movement of the movable wall in one direction, means biasing the movable wall in said one direction to maintain the valve open until the signal pressure exceeds said first value to cause movement of the movable wall in the opposite direction against the force of the biasing means to close the valve, and means for connecting said other side of the movable wall with the inlet passage to augment the force of the biasing means with signal pressure when the signal pressure exceeds said second value.

6. A pneumatic relay as defined in claim 5 in which said last named means includes:

a pilot chamber, a second movable wall exposed on one side to the pressure in the pilot chamber and on the other side to the pressure in the inlet passage, a pilot port connecting the pilot chamber with the inlet passage, a normally closed pilot valve in the pilot port operatively connected with the second movable wall for movement to an open position upon movement of the movable wall in one direction, means connecting the pilot chamber with said constant pressure upon movement of the second movable wall in the opposite direction, means biasing the second movable wall in said opposite direction to maintain communication between the pilot chamber and said constant pressure until the signal pressure exceeds said second value to cause movement of the second movable wall in said one direction to open the pilot valve, and means connecting the pilot chamber with said other side of the first movable wall.

7. A pneumatic relay comprising:

an inlet passage for connection with a variable signal pressure, an output chamber having an inlet and an outlet, a normally closed supply valve in the inlet controlling communication between the inlet passage and the output chamber, a first wall having one side exposed to the output pressure and the other side normally exposed to a fixed pressure and movable in response to pressure differentials acting across the first wall,
an actuating element carried by the first movable wall,
a passage in the actuating element opening at one end into the output chamber and opening at the other end to atmosphere,
said actuating element being movable into engagement with the supply valve to close said one end of the passage and further movable to open the supply valve,
a first spring biasing the actuating element to open the supply valve,
a pilot chamber having an inlet port,
a normally closed pilot valve in the pilot chamber inlet port controlling communication between the inlet passage and the pilot chamber,
a second movable wall having one side exposed to the pilot chamber pressure and the other side exposed to the pressure in the inlet passage,
means connecting the pilot chamber to said other side of the first movable wall,
a pilot valve actuating element carried by the second movable wall,
a passage in the pilot valve actuating element opening at one end into the pilot chamber and opening at the other end to said fixed pressure,
said pilot valve actuating element being movable into engagement with the pilot valve to close said one end of the passage upon increases in signal pressure and further movable to open the pilot valve and augment the first spring with signal pressure from the inlet passage,
and a second spring biasing the pilot valve actuating element out of engagement with the pilot valve.

8. A pneumatic relay as defined in claim 7 including: means for independently adjusting the bias of the first and second spring means to selectively vary the first and second values of the signal pressure, respectively.

9. A pneumatic relay as defined in claim 7 including: a relief port between the inlet passage and the output chamber,
and a check valve in the relief port operative to close the relief port when the signal pressure exceeds the prsesure in the output chamber and operative to open the relief port when the output pressure exceeds the signal pressure.

10. A pneumatic relay comprising:
an inlet passage for connection with a variable signal pressure,
an output chamber having an inlet and an outlet,
a normally closed supply valve movable in the inlet to control communication between the output chamber and the inlet passage,
a first pair of spaced diaphragms forming one wall of the output chamber with the space between the diaphragms connected to atmosphere,
an actuating member connecting said first pair of diaphragms,
a passage in the actuating member opening at one end into the pilot chamber and opening at the other end into the space between the diaphragms,
said actuating member being movable into engagement with the supply valve to close said one end of the passage and further movable to open the supply valve,
a first spring biasing the actuating element to open the valve to maintain the output pressure equal to the signal pressure until the signal pressure exceeds a first value sufficient to overcome the biasing force of said first spring,
a pilot chamber having an inlet port,
a normally closed pilot valve movable in the inlet port of the pilot chamber to control communication between the inlet passage and the pilot chamber,
a passage connecting the side of said first pair of diaphragms opposite the output chamber with the pilot chamber,
a second pair of spaced diaphragms forming one wall of the pilot chamber with the space between the second pair of diaphragms connected to atmosphere,
a pilot valve actuating member connecting said second pair of diaphragms,
a passage in the pilot valve actuating member opening at one end into the pilot chamber and opening at the other end into the space between said second pair of diaphragms,
said pilot valve actuating member being movable into engagement with the pilot valve to close said one end of its passage and further movable to open the pilot valve to augment the first spring with signal pressure,
means connecting the side of said second pair of diaphragms opposite the pilot chamber with the inlet passage,
and second spring means biasing the pilot valve actuating element to connect the pilot chamber with atmosphere until the signal pressure exceeds a second value sufficient to overcome the biasing force of the second spring means.

References Cited in the file of this patent

UNITED STATES PATENTS

| | | |
|---|---|---|
| 2,896,599 | Ensign | July 28, 1959 |
| 2,952,272 | Hansen | Sept. 30, 1960 |
| 2,982,294 | Koutnik | May 2, 1961 |